United States Patent
Utsunomiya (10) Patent No.: US 7,384,561 B2
(45) Date of Patent: Jun. 10, 2008

(54) APPARATUS AND METHOD FOR SEPARATING MAGNETIC PARTICLES

(75) Inventor: Norihiko Utsunomiya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 11/165,503

(22) Filed: Jun. 24, 2005

(65) Prior Publication Data

US 2006/0011552 A1    Jan. 19, 2006

(30) Foreign Application Priority Data

Jun. 25, 2004    (JP) .............................. 2004-188626

(51) Int. Cl.
*B01D 35/06*    (2006.01)
*G01N 33/53*    (2006.01)

(52) U.S. Cl. ...................... 210/695; 210/222; 210/223; 422/68.1; 435/4; 436/526

(58) Field of Classification Search ................ 210/222, 210/223, 695; 422/68.1; 435/4; 436/526
See application file for complete search history.

(56) References Cited

U.S. PATENT DOCUMENTS

| | | | |
|---|---|---|---|
| 6,068,752 A | 5/2000 | Dubrow et al. | 204/604 |
| 6,432,630 B1 | 8/2002 | Blankenstein | 435/4 |

*Primary Examiner*—David A Reifsnyder
(74) *Attorney, Agent, or Firm*—Fitzpatrick, Cella, Harper & Scinto (57) ABSTRACT

An apparatus for separating a predetermined amount of magnetic particles in a fluid, including a fluid conveyance portion having at least a first flow channel for supplying a fluid containing the magnetic particles, a second flow channel for discharging the separated magnetic particles, and an intersection at which the first flow channel and the second flow channel intersect each other, a capture unit for capturing a predetermined amount of the magnetic particles in the fluid supplied from the first flow channel to the intersection when a magnetic field is applied to the intersection of the fluid conveyance portion, and a discharge unit for removing the magnetic field applied to the intersection to discharge the magnetic particles captured by the capture unit by way of a medium introduced into the second flow channel.

13 Claims, 6 Drawing Sheets

APPARATUS AND METHOD FOR SEPARATING MAGNETIC PARTICLES

BACKGROUND OF THE INVENTION

1. Field of the Invention

The present invention relates to an apparatus for separating magnetic particles and a separation method using the apparatus as well as an apparatus for capturing and separating particular substances in a fluid using magnetic particles. Of those substances, the present invention particularly relates to the capture and separation of biomolecules such as proteins, sugars, lipids, and nucleic acids, cells, or the like contained in samples derived from organisms. The present invention further relates to a detection apparatus for quantifying the amount of particular substances using the capture and separation function described above.

2. Related Background Art

Approaches for separating particular substances in samples by the use of particles are known and are large in number. In separation approaches using magnetic particles, which are intended by the present invention, surface-modified magnetic particles as typified by Dynabeads commercially available from Dynal Biotech are available for applications such as cell separation. Moreover, those employing flow cytometry approaches using micro flow channels as described in U.S. Pat. No. 6,432,630 have been proposed as apparatuses for automating cell separation using the above-described particles.

An approach using an intersection of flow channels as described in U.S. Pat. No. 6,068,752 in which each flow of intersecting flow channels is switched on/off to thereby cut out a fluid corresponding to the volume of the intersection has been disclosed as a method of quantitatively separating a fluid without the use of particles.

As described in the background arts above, separation approaches using magnetic particles have already been proposed and particle-by-particle separation apparatuses using the approaches have been automated. However, an additional washing step is required for eliminating the contamination of other foreign substances in a sample in the separation and extracting a particular substance contained in the sample. Besides, a method of efficiently separating a predetermined amount of particles from particles dispersed in a fluid has not been proposed yet.

SUMMARY OF THE INVENTION

The present invention has been achieved in consideration of such background arts and provides an apparatus for separating magnetic particles and a separation method using the apparatus, in which a predetermined amount of magnetic particles can be separated from a fluid while as large an amount of foreign substances are eliminated without the washing step described above.

The present invention also provides an apparatus for detecting a target substance specifically binding to the magnetic particles described above and a detection method using the apparatus.

The present invention constitutes a first flow channel for supplying a fluid containing magnetic particles and a second flow channel for discharging the separated magnetic particles, and the first flow channel and the second flow channel intersect each other. The present invention is constructed so that: a magnetic field is applied to an intersection of the two intersecting flow channels to supply a predetermined amount of a fluid containing magnetic particles to the first flow channel; and the magnetic field applied to the intersection is subsequently removed, while a fluid for discharging magnetic particles is sent to the second flow channel to thereby discharge the magnetic particles.

That is, according to one aspect of the present invention, there is provided an apparatus for separating a predetermined amount of magnetic particles in a fluid, including: a fluid conveyance portion having at least a first flow channel for supplying a fluid containing the magnetic particles, a second flow channel for discharging the separated magnetic particles, and an intersection at which the first flow channel and the second flow channel intersect each other; capture means for capturing a predetermined amount of the magnetic particles in the fluid supplied from the first flow channel to the intersection when a magnetic field is applied to the intersection of the fluid conveyance portion; and discharge means for removing the magnetic field applied to the intersection to discharge the magnetic particles captured by the capture means by way of a medium introduced into the second flow channel.

According to another aspect of the present invention, there is provided an apparatus for detecting a target substance in a fluid, including: a fluid conveyance portion having at least means for binding a target substance in a fluid to magnetic particles each having a function of specifically binding to the target substance, a first flow channel for supplying a fluid containing the magnetic particles bound with the target substance, a second flow channel for discharging the separated magnetic particles bound with the target substance, and an intersection at which the first flow channel and the second flow channel intersect each other; capture means for capturing a predetermined amount of the magnetic particles bound with the target substance in the fluid supplied from the first flow channel to the intersection when a magnetic field is applied to the intersection of the flow channels; discharge means for removing the magnetic field applied to the intersection to discharge the magnetic particles bound with the target substance that have been captured by the capture means by way of a medium introduced into the second flow channel; and detection means for detecting an amount of the target substance bound with the magnetic particles discharged by the discharge means.

In further aspect of the apparatus, the predetermined amount is controlled according to a sensitivity range of the detection means.

In further aspect of the apparatus, the apparatus further includes means for recirculating the fluid from the detection means to the first flow channel.

According to another aspect of the present invention, there is provided a method of separating a predetermined amount of magnetic particles in a fluid, including the steps of: applying a magnetic field to an intersection of intersecting flow channels composed of a first flow channel for supplying a fluid containing the magnetic particles and a second flow channel for discharging the separated magnetic particles, while supplying a fluid containing the magnetic particles from the first flow channel to the intersection, to capture a predetermined amount of the magnetic particles in the fluid; and removing the magnetic field applied to the intersection to discharge the captured magnetic particles by way of a medium introduced through the second flow channel.

According to another aspect of the present invention, there is provided a method of detecting a target substance in a fluid, including the steps of: binding a target substance in a fluid to magnetic particles each having a function of specifically binding to the target substance; applying a magnetic field to an intersection of intersecting flow channels composed of a first flow channel for supplying a fluid containing the magnetic particles bound with the target substance and a second flow channel for discharging the separated magnetic particles bound with the target substance, while supplying a fluid containing the magnetic particles bound with the target substance from the first flow channel to the intersection, to capture a predetermined amount of the magnetic particles bound with the target substance in the fluid; removing the magnetic field applied to the intersection to discharge the captured magnetic particles bound with the target substance by way of a medium introduced through the second flow channel; and detecting an amount of the target substance bound with the discharged magnetic particles.

A first effect of the present invention is that because magnetic particles supplied from the first low channel to the intersection of the flow channels are captured and then discharged to the second flow channel, the amount of a medium carried over from the first flow channel to the second flow channel can be limited to an amount corresponding to the volume of the intersection of the flow channels. In addition, because magnetic particles are discharged to the second flow channel after they are captured in the intersection, the ratio of the medium carried over from the first flow channel to the desired magnetic particles to be captured can be reduced with respect to the amount of the particles. That is, the amount of foreign substances carried over can be considerably reduced with respect to the amount of the desired particles to be captured.

A second effect of the present invention is that because the amount of magnetic particles to be captured in the intersection can be controlled according to variations in the amount of a fluid sent to the first flow channel, any amount of magnetic particles can be discharged to the second flow channel. When this advantage is combined with, for example, a sensor for measuring the amount of an unknown substance in a fluid, particles having any concentration can be supplied to the sensor portion so that the concentration falls within the detection range of the sensor.

DESCRIPTION OF THE PREFERRED EMBODIMENTS

Hereinafter, the present invention will be described in detail.

The best mode for carrying out the present, invention will now be illustrated.

Apparatuses of the present invention each include: a fluid conveyance portion having a first flow channel for supplying a fluid containing magnetic particles and a second flow channel for discharging the separated magnetic particles in which the first flow channel and the second flow channel intersect each other; and a site to which a magnetic field for capturing the magnetic particles in an intersection of the flow channels is applied. The apparatuses each further have a function of controlling the supply of a fluid in the first flow channel so that a fluid containing a predetermined amount of magnetic particles is supplied to the intersection when a magnetic field is applied to the intersection of the flow channels. The apparatuses each have an additional function with which the apparatus works in such a way that after a predetermined amount of the magnetic particles are captured in the intersection by the control function described above, the magnetic field applied to the intersection is removed and a fluid for discharging magnetic particles is supplied to the second flow channel to discharge the magnetic particles captured in the intersection. Those are the basic components of the present invention.

Next, each component in the best mode of the present invention will be illustrated.

Fluid Conveyance Portion

Figure 1:
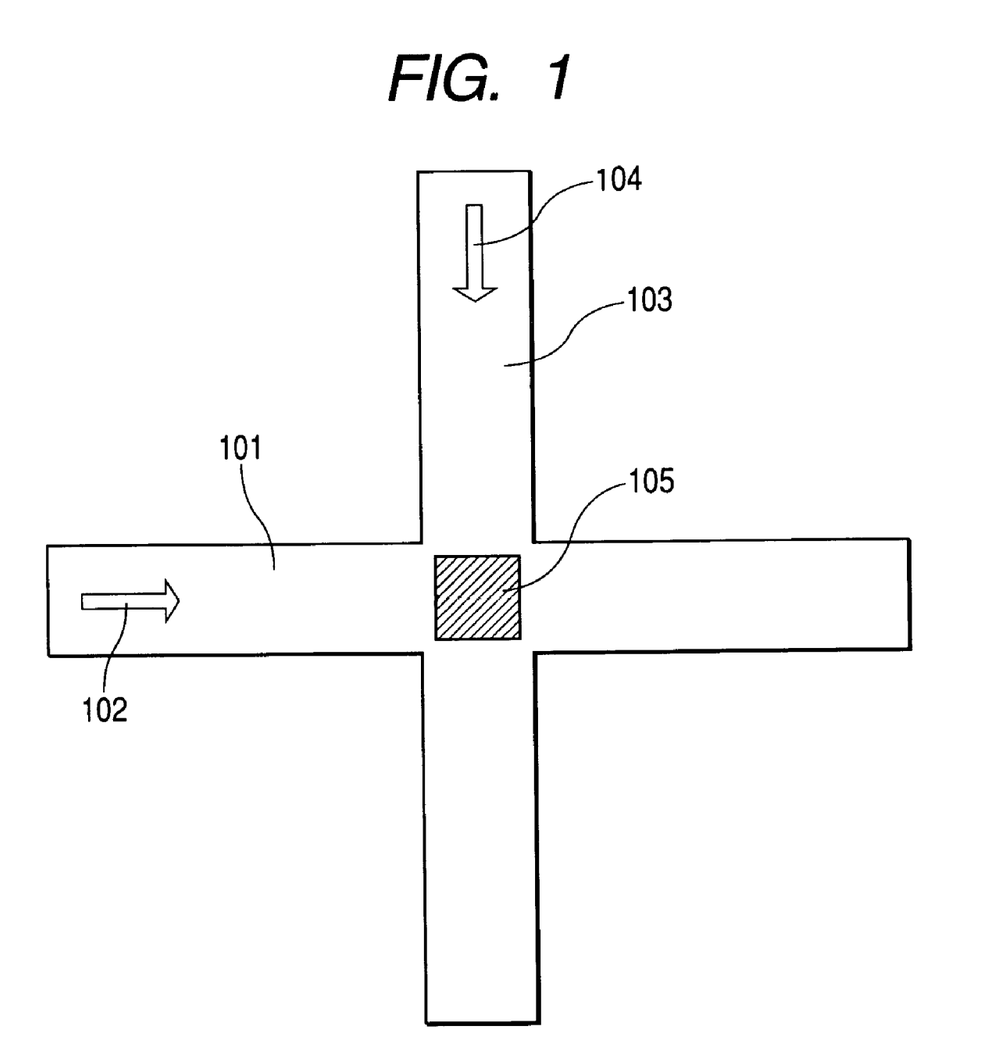
FIG. 1 is a conceptual view showing a fluid conveyance portion in the present invention.

A fluid conveyance portion will be described with reference to FIG. 1. FIG. 1 is a conceptual view showing the fluid conveyance portion composing the apparatus for separating magnetic particles or the apparatus for detecting a target substance of the present invention. Reference numeral 101 denotes a first flow channel for supplying a fluid containing magnetic particles. Reference numeral 102 denotes a flow of the fluid containing magnetic particles. Reference numeral 103 denotes a second flow channel for discharging magnetic particles after separation. Reference numeral 104 denotes a flow of the fluid for discharging magnetic particles after separation. Reference numeral 105 denotes a capture portion to which a magnetic field for separating magnetic particles from the flow 102 is applied.

However, the fluid conveyance portion is not necessarily required to include a function of developing a magnetic field. This fluid conveyance portion may be constructed of a chip-like plate having grooves formed thereon or may be formed by jointing tubular members. Materials composing the wall surfaces of the flow channels are not particularly limited as long as they have mechanical strength in response to pressure applied to the flow channels, stress applied in handling, and so on. Regarding the width of the flow channels and flow velocity, it is desirable to use the width of the flow channels and flow velocity that allow a fluid containing magnetic particles to form a laminar flow at a Reynolds number of 50 or less in the flow channels. Because other parameters for a Reynolds number are related to the density and viscosity of a fluid, it is desirable to adjust the Reynolds number to the viscosity of a fluid containing magnetic particles that is used. A more desirable value of the Reynolds number ranges from 0.05 to 25 in consideration of the resistance in the flow channels and so on. Although fluid propelling means for determining a flow velocity is not illustrated here, a syringe pump suitable for fluid conveyance at a constant flow velocity and fluid conveyance in constant amounts is desirable. However, any pump may be used as long as it facilitates the control of constant flow velocity and fluid conveyance in constant amounts.

Magnetic Field Application Means

Figure 2:
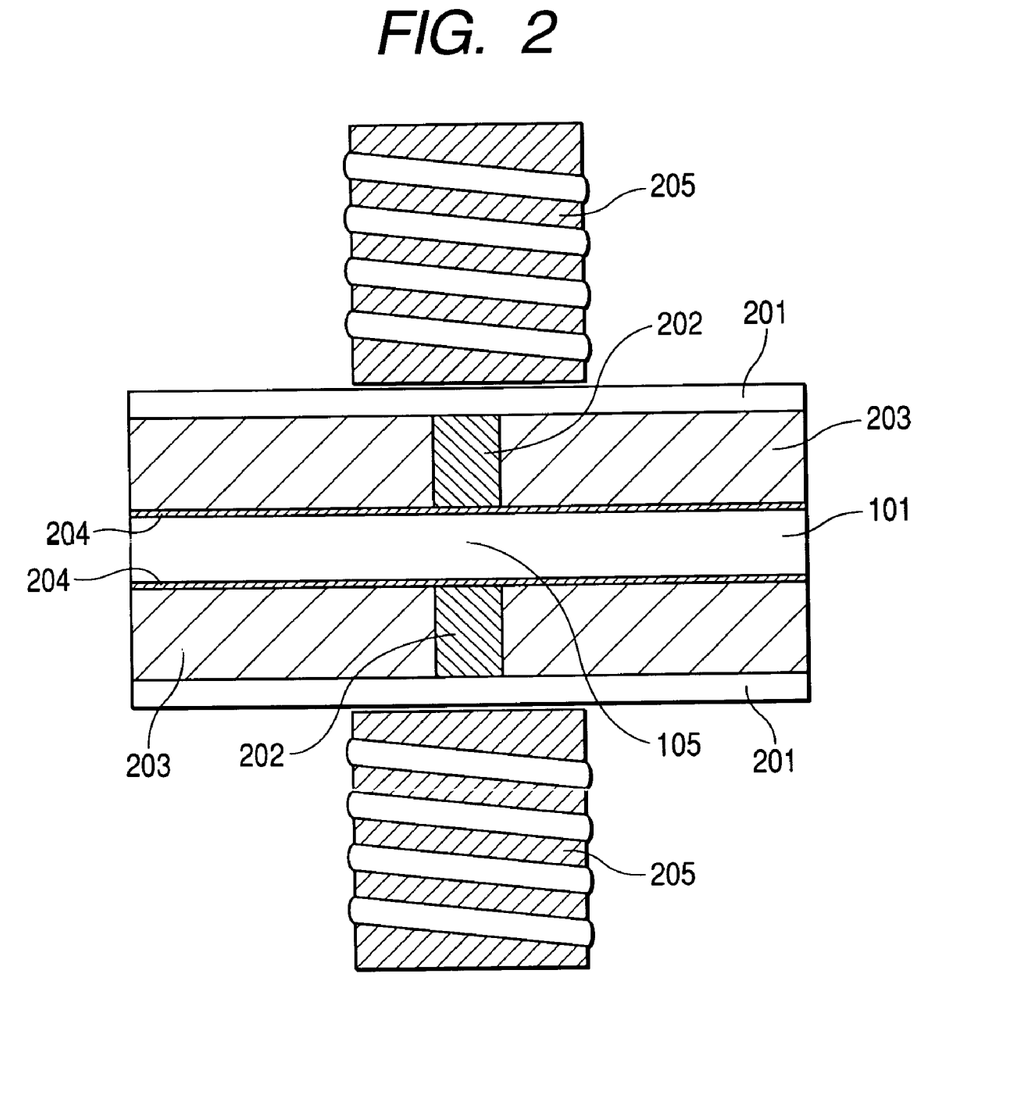
FIG. 2 is a sectional view showing a portion to which a magnetic field is applied in the present invention.

Magnetic field application means will be described with reference to FIG. 2. FIG. 2 is a sectional view showing a method of applying a magnetic field from the outside by taking a cross section along the first flow channel 101 shown in FIG. 1. Reference numeral 101 denotes the first flow channel for supplying a fluid containing magnetic particles. Reference numeral 105 denotes the capture portion for capturing magnetic particles in the fluid by applying a magnetic field. Reference numeral 201 denotes a substrate for forming the mechanical skeleton of the fluid conveyance portion and holding the flow channels. Materials for this substrate are not limited as long as they have the same properties as those of the materials for the wall surfaces of the flow channels described above. Reference numeral 202 denotes a member with high magnetic permeability for concentrating a magnetic field on the capture portion 105 for magnetically capturing magnetic particles. In terms of properties for materials, it is desirable to use soft magnetic materials such as ferrite having small coercivity so that high magnetic permeability and high saturation magnetic flux density are attained when an external magnetic field is applied and residual magnetization becomes almost 0 when the external magnetic field is removed.

It is desirable to use, as a member 203, a member with non-high magnetic permeability composed of a material having magnetic permeability smaller than that of the material for the member with high magnetic permeability 202. Here, the member with high magnetic permeability 202 and the member 203 with magnetic permeability smaller than that of the member 202 are provided adjacent to each other along the first flow channel. Reference numeral 204 denotes a protective film for protecting the member with high magnetic permeability 202 and the member with non-high magnetic permeability 203 from corrosion by a fluid running in the first flow channel 101. A material for this protective film is not particularly limited as long as it is resistant to corrosion by a fluid used. Reference numeral 205 denotes an electromagnet for applying a magnetic field to the capture portion 105 via the member with high magnetic permeability 202. Although the electromagnet selectable between ON and OFF of magnetic field application by toggling ON/OFF currents running into coils is shown here, magnetic field application may be designed to be selectable between ON and OFF by placing a permanent magnet in the vicinity of or away from the intersection of the flow channels in the fluid conveyance portion. In addition, magnetic field application to the capture portion 105 may be designed to be weakened by bypassing a magnetic circuit by a permanent magnet using a material with high magnetic permeability. As shown in FIG. 2, the members 201, 202, 203, 204, and 205 are constructed to sit across the first flow channel 101 from their counterparts. This allows a magnetic field by the coils of both of the upper and lower electromagnets 205 to form a magnetic circuit via both of the upper and lower members with high magnetic permeability 202 to thereby form a high-density magnetic field in the capture portion 105.

Magnetic Particles

Magnetic particles used in the present invention will be described with reference to FIGS. 3A to 3D. FIGS. 3A to 3D show examples of magnetic particles that can be used in the present invention. It is desired that the particles have the property of superparamagnetism as property required in common. Reference numerals 301, 302, and 303 denote a magnetic material, a non-magnetic material, and a target substance capture body, respectively, which are in common in FIGS. 3A to 3D.

Figure 3A:
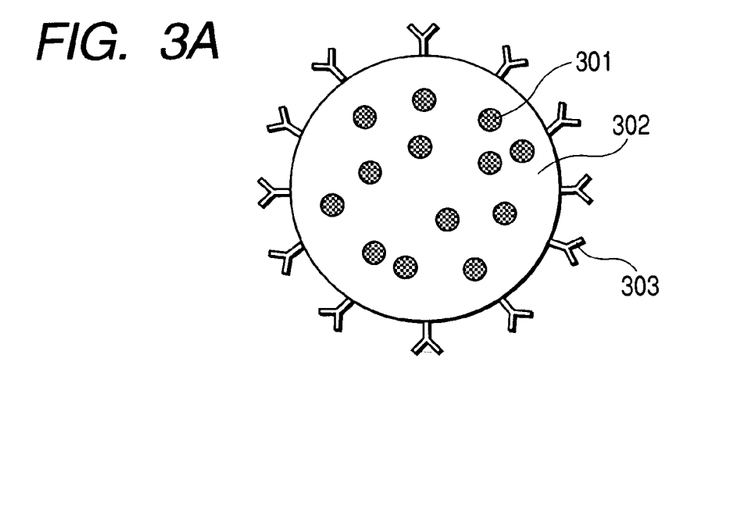
FIGS. 3A, 3B, 3C and 3D are diagrammatic views showing magnetic particles in the present invention.

At first, in FIG. 3A, a magnetic substance is formed by dispersing microparticles made of the magnetic materials in the non-magnetic material. It is desired that each magnetic material 301 exhibits superparamagnetism. No particular limitation is imposed on the non-magnetic material 302. The target substance capture body 303 will be described below.

Figure 3B:
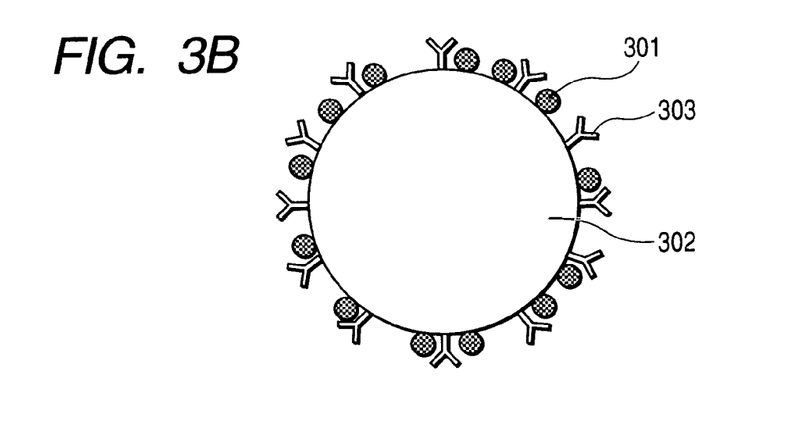

In FIG. 3B, the non-magnetic material 302 composes the core of a magnetic particle. No particular limitation is also imposed on this non-magnetic material. Particles made of the magnetic materials 301 are disposed around the core. As in FIG. 3A, it is desired that the magnetic material 301 exhibit superparamagnetism.

Figure 3C:
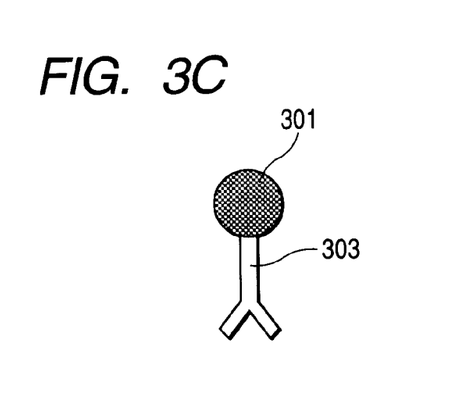
Figure 3D:
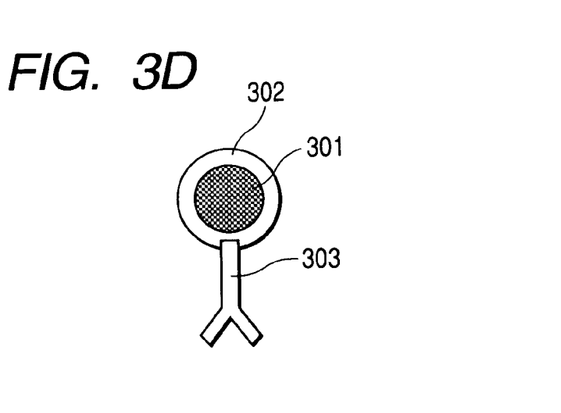

In FIG. 3C, the target substance capture body 303 is directly fixed on a particle made of the magnetic material 301. Similarly, it is desired that the magnetic material 301 exhibit superparamagnetism. In construction shown in FIG. 3D, the surface of a microparticle made of the magnetic material 301 is coated with the non-magnetic material 302, and the target substance capture body 303 is further fixed on the coated portion. Similarly, it is desired that the particle made of the magnetic material 301 exhibit superparamagnetism. The particle size of the magnetic particle is not particularly limited and, however, is preferably 40 µm or less in terms of dispersibility in a fluid.

Target Substance Capture Body

The target substance capture body 303 shown in each of FIGS. 3A to 3D will be described.

First, the target substance capture body is not limited as long as it can form a specific bond pair with a target substance. Specifically, the target substance contained in a sample is classified into a biological substance or nonbiological substance. Examples of a nonbiological substance having great industrial significance include: PCBs with various numbers/positions of substitution of chlorine as an environmental contaminant; dioxins with various numbers/positions of substitution of chlorine; and endocrine disruptors referred to as environmental hormones (such as hexachlorobenzene, pentachlorophenol, 2,4,5-trichloroacetic acid, 2,4-dichlrophenoxyacetic acid, amitrole, atrazine, alachlor, hexachlorocyclohexane, ethylparathion, chlordane, oxychlordane, nonachlor, 1,2-dibromo-3-chloropropane, DDT, kelthane, aldrin, endrin, dieldrin, endosulfan (benzoepin), heptachlor, heptachlor epoxide, malathion, methomyl, methoxychlor, mirex, nitrofen, toxaphene, trifluralin, alkylphenol (5 to 9 carbon atoms), nonylphenol, octynonylphenol, 4-octylphenol, bisphenol A, di-2-ethylhexyl phthalate, butylbenzyl phthalate, di-n-butyl phthalate, dicyclohexyl phthalate, diethyl phthalate, benzo(a)pyrene, 2,4-dichlorophenol, di-2-ethylhexyl adipate, benzophenone, 4-nitrotoluene, octachlorostyrene, aldicarb, benomyl, kepone (chlordecone), manzeb (mancozeb), maneb, metiram, metribuzin, cypermethrin, esfenvalerate, fenvalerate, permethrin, vinclozolin, zineb, ziram, dipentyl phthalate, dihexyl phthalate, and dipropyl phthalate).

Examples of the biological substance include biological substances selected from nucleic acids, proteins, sugar chains, lipids, and complexes thereof. More specifically, the present invention can be applied to any of substances as long as they contain biological substances selected from nucleic acids, proteins, sugar chains, and lipids, and more specifically, contain substances selected from DNA, RNA, aptamers, genes, chromosomes, cell membranes, viruses, antigens, antibodies, lectin, hapten, hormones, receptors, enzymes, peptides, sphingoglycolipid, and sphingolipid. In addition, bacteria and cells themselves that produce the "biological substances" described above can be target substances as the "biological substances" intended by the present invention.

Concrete examples of the proteins include so-called disease markers.

Examples of the disease markers include: α-fetoprotein (AFP), an acid glycoprotein produced in hepatic cells for a fetal period and present in fetal blood, as a marker for hepatocellular carcinoma (primary liver cancer), hepatoblastoma, metastatic liver cancer, and yolk sac tumor; PIVKA-II, abnormal prothrombin appearing at the time of hepatic parenchymal injury, which is confirmed to specifically appear in hepatocellular carcinoma; BCA225, a glycoprotein that is an antigen immunohistochemically specific for breast cancer, as a marker for advanced primary breast cancer and recurrent/metastatic breast cancer; basic fetoprotein (BFP), a basic fetal protein found in extracts from human fetal serum, intestine, and brain tissue, as a marker for ovarian cancer, testicular tumor, prostatic cancer, pancreatic carcinoma, biliary tract carcinoma, hepatocellular carcinoma, renal cancer, lung cancer, gastric cancer, bladder carcinoma, and colon cancer; a carbohydrate antigen CA15-3 as a marker for advanced breast cancer, recurrent breast cancer, primary breast cancer, and ovarian cancer; a carbohydrate antigen CA19-9 as a marker for pancreatic carcinoma, biliary tract carcinoma, gastric cancer, liver cancer, colon cancer, and ovarian cancer; a carbohydrate antigen CA72-4 as a marker for ovarian cancer, breast cancer, colorectal cancer, gastric cancer, and pancreatic carcinoma; a carbohydrate antigen CA125 as a marker for ovarian cancer (particularly, serous cystadenocarcinoma), adenocarcinoma of the uterine body, cancer of the Fallopian tube, adenocarcinoma of the uterine cervix, pancreatic carcinoma, lung cancer, and colon cancer; a glycoprotein CA130 as a marker for epithelial ovarian cancer, cancer of the Fallopian tube, lung cancer, hepatocellular carcinoma, and pancreatic carcinoma; a core protein antigen CA602 as a marker for ovarian cancer (particularly, serous cystadenocarcinoma), adenocarcinoma of the uterine body, and adenocarcinoma of the uterine cervix; a core carbohydrate-related antigen CA54/61 (CA546) as a marker for ovarian cancer (particularly, mucinous cystadenocarcinoma), adenocarcinoma of the uterine cervix, and adenocarcinoma of the uterine body; a carcinoembryonic antigen (CEA) that has currently been used most widely for assistance in diagnosing cancer as a tumor-associated marker antigen for colon cancer, gastric cancer, rectal cancer, biliary tract carcinoma, pancreatic carcinoma, lung cancer, breast cancer, uterine cancer, and urinary system cancer; a carbohydrate antigen DUPAN-2 as a marker for pancreatic carcinoma, biliary tract carcinoma, hepatocellular carcinoma, gastric cancer, ovarian cancer, and colon cancer; elastase 1, an exocrine pancreatic protease present in the pancreas that specifically hydrolyzes an elastic fiber elastin (composing arterial walls, tendons, and the like) in connective tissue, as a marker for pancreatic carcinoma, cystic carcinoma of the pancreas, and biliary tract carcinoma; an immunosuppressive acidic protein (IAP), a glycoprotein present at high concentrations in the ascites and serum of a human patient with cancer, as a marker for lung cancer, leukemia, cancer of the esophagus, pancreatic carcinoma, ovarian cancer, renal cancer, cholangioma, gastric cancer, bladder carcinoma, colon cancer, thyroid carcinoma, and malignant lymphoma; a carbohydrate antigen NCC-ST-439 as a marker for pancreatic carcinoma, biliary tract carcinoma, breast cancer, colon cancer, hepatocellular carcinoma, adenocarcinoma of the lung, and gastric cancer; a glycoprotein γ-seminoprotein (γ-Sm) as a marker for prostatic cancer; a prostate-specific antigen (PSA), a glycoprotein present only in prostate tissue that is extracted from human prostate tissue, thus as a marker for prostatic cancer; prostatic acid phosphatase (PAP), an enzyme that hydrolyzes phosphoric ester at acidic pH secreted from the prostate, used as a tumor marker for prostatic cancer; neuron-specific enolase (NSE), an enzyme in glycolytic pathways that is specifically present in nervous tissue and neuroendocrine cells, as a marker for lung cancer (particularly, small cell carcinoma of the lung), neuroblastoma, nervous system tumor, islet cell cancer, small cell carcinoma of the esophagus, gastric cancer, renal cancer, and breast cancer; a squamous cell carcinoma-related antigen (SCC antigen), a protein that is extracted and purified from the metastatic focus of squamous cell carcinoma of the uterine cervix in the liver, as a marker for uterine cancer (cervical squamous cell carcinoma), lung cancer, cancer of the esophagus, head and neck cancer, and skin cancer; a carbohydrate antigen sialyl Lex-i antigen (SLX) as a marker for adenocarcinoma of the lung, cancer of the esophagus, gastric cancer, colon cancer, rectal cancer, pancreatic carcinoma, ovarian cancer, and uterine cancer; a carbohydrate antigen Span-1 as a marker for pancreatic carcinoma, biliary tract carcinoma, liver cancer, gastric cancer, and colon cancer; a tissue polypeptide antigen (TPA), a single-stranded polypeptide useful for the speculation, prediction of recurrence, and observation of therapeutic process of advanced cancer particularly in combination with other tumor markers, as a marker for cancer of the esophagus, gastric cancer, colorectal cancer, breast cancer, hepatocellular carcinoma, biliary tract carcinoma, pancreatic carcinoma, lung cancer, and uterine cancer; a core carbohydrate antigen sialyl Tn antigen (STN) as a marker for ovarian cancer, metastatic ovarian cancer, gastric cancer, colon cancer, biliary system cancer, pancreatic carcinoma, and lung cancer; cytokeratin (CYFRA) as an effective tumor marker for the detection of non-small cell carcinoma of the lung, particularly squamous cell carcinoma of the lung; pepsinogen (PG), the inactive precursor of two pepsins (PG I and PG II) that are proteases secreted into gastric juice, as a marker for gastric ulcer (particularly, gastric ulcer located in the lower part), gastroduodenal ulcer (particularly, recurrent and intractable cases), Brunner's gland adenoma, Zollinger-Ellison syndrome, and acute gastritis; a C-reactive protein (CRP), an acute phase reactant varying in quantity in plasma by infection and tissue injury, which shows high values when myocardial necrosis is caused by acute myocardial infarction and the like; a serum amyloid A protein (SAA), an acute phase reactant varying in quantity in plasma by tissue injury and infection; myoglobin, a heme protein with a molecular weight of approximately 17,500 that is present mainly in cardiac muscles and skeletal muscles, as a marker for acute myocardial infraction, muscular dystrophy, polymyositis, and dermatomyositis; BNP, a brain natriuretic peptide composed of 32 amino acids and derived from ventricle, which is useful for ascertaining the conditions of cardiac failure; ANP, similarly, a natriuretic peptide derived from atrium; creatine kinase (CK) (three isozymes of CK-MM type derived from skeletal muscles, CK-BB type derived from brains and smooth muscles, and CK-MB type derived from cardiac muscles, mitochondrial isozyme, and immunoglobulin-linked CK (macro CK)), an enzyme present mainly in the soluble fractions of skeletal muscles and cardiac muscles that emigrates into blood by cell injury, as a marker for acute myocardial infarction, hypothyroidism, progressive muscular dystrophy, and polymyositis; troponin T, a protein with a molecular weight of 39,000 that forms a troponin complex with troponin I and troponin C on the thin filaments of striated muscles and participates in the regulation of muscular contraction, as a marker for rhabdomyolysis, myocarditis, myocardial infarction, and renal failure; ventricular myosin light chain I, a protein contained in the cells of any of skeletal muscles and cardiac muscles, which is used as a marker for acute myocardial infarction, muscular dystrophy, and renal failure because a rise in its measurement means injury and necrosis in skeletal muscles and cardiac muscles; and chromogranin A, thioredoxin, 8-OHdG, and cortisol, which are attracting attention as stress markers in recent years.

An "antibody", a kind of capture body in the present invention, means immunoglobulin that is produced in the body of an organism in the nature or entirely or partially synthesized by gene recombination techniques and protein engineering techniques as well as organic reactions and the like. All derivatives thereof retaining specific binding ability are also encompassed by the "antibody" in the present invention. This term also includes any protein (including a chimeric antibody and a humanized antibody) having a binding domain homologous or highly homologous to the binding domain of immunoglobulin. Such an "antibody or "immunoglobulin" is allowed to be produced in the body of an organism in the nature or to be entirely or partially synthesized and modified.

The "antibody" or "immunoglobulin" can be a monoclonal antibody or polyclonal antibody specific for a target substance.

The "antibody" or "immunoglobulin" can be a member of any immunoglobulin class including any human immunoglobulin class (IgG, IgM, IgA, IgD, and IgE) and more preferably, a derivative of IgG class in the present invention.

An "antibody fragment" in the present invention refers to any antibody molecule or complex smaller than the full length of the antibody or immunoglobulin described above. Preferably, the antibody fragment retains at least the critical portion of the specific binding ability of the antibody having full length. Examples of the antibody fragment include, but not limited to, Fab, Fab', F(ab')2, scFv, Fv, diabody, and Fd fragments.

The antibody fragment can be produced by any means. For example, the antibody fragment can be enzymatically or chemically produced by the fragmentation of an intact antibody, or can be recombinantly produced with a gene encoding a partial antibody sequence. Alternatively, the antibody fragment can be entirely or partially produced in a synthetic manner. The antibody fragment can be a single-stranded antibody fragment, if necessary. Alternatively, the antibody fragment can contain several chains linked through, for example, a disulfide (—S—S—) bond. The antibody fragment may also be a complex of several molecules, if necessary. A functional antibody fragment typically contains at least approximately 50 amino acids, more typically at least approximately 200 amino acids.

A "variable domain" in the present invention refers to a domain at the end of immunoglobulin (usually described as "Fv") that contains an amino acid sequence portion varying depending on each antigen in order to exert a specific binding/capture function according to the type of a target substance (antigen).

The above-described Fv is composed of "the variable domain of a heavy chain (hereinafter, also referred to as "VH")" and "the variable domain of a light chain (hereinafter, also referred to as "VL")" and immunoglobulin G usually contains two VH domains and two VL domains.

The "functional portion of the variable domain of immunoglobulin heavy chain or light chain" (hereinafter, also referred to as a "functional portion" simply) in the present invention is a portion actually responsible for specificity for a target substance (antigen) in the variable domain described above and is also used for referring to a portion academically designated as complementarity determining region (CDR: hypervariable region) and particularly a portion actually responsible for specificity for a target substance (antigen) in the CDR.

Interaction between a target substance and the capture body may be any interaction as long as its physical/chemical variation before and after binding is detectable by the elements of the present invention. However, preferable examples of the interaction include "antigen-antibody reaction", "antigen-aptamer (RNA fragment having a particular structure) interaction", "ligand-receptor interaction", "DNA hybridization", "DNA-protein (e.g., transcription factor) interaction", and "lectin-sugar chain interaction".

Separation Apparatus

Figure 4:
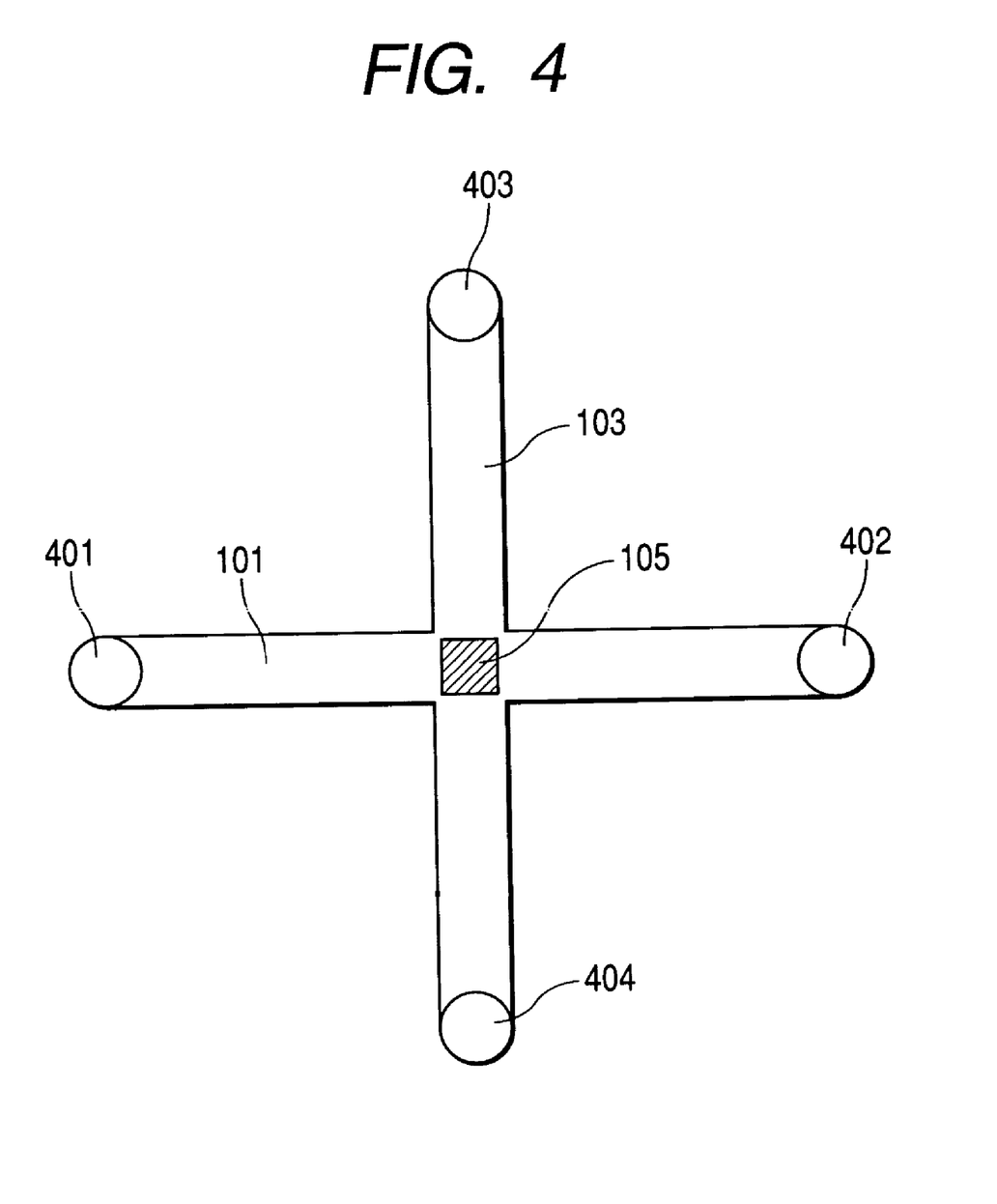
FIG. 4 is a diagrammatic view showing an apparatus for separating magnetic particles in the present invention.

A separation apparatus will be described with reference to FIG. 4. Reference numerals 401 to 404 each denote a pump connection port for connecting an external pump unit therewith. Reference numeral 401 denotes a connection portion to a pump for supplying magnetic particles (supply); 402, a connection portion to a pump for supplying magnetic particles (aspiration); 403, a connection portion to a pump for discharging magnetic particles (supply); and 404, a connection portion to a pump for discharging magnetic particles (aspiration).

The connection portions (supply) 401 and 403 are connected to pump units that carry out fluid conveyance and the connection portions (aspiration) 402 and 404 are connected to pump units that carry out aspiration. When a fluid containing magnetic particles is supplied to the first flow channel 101, the fluid containing magnetic particles is fed through the pump unit connected to the connection portion 401, concurrently with aspiration at the same flow velocity with the aspiration pump connected to the connection portion 402. When a fluid for discharging magnetic particles is sent to the second flow channel 103, the connection ports 403 and 404 can be similarly used to thereby send the fluid. The capture portion 105 for capturing magnetic particles in the intersection of the flow channels is as is described with reference to FIG. 2.

Although the present invention will be described hereinafter with reference to the drawings, the scope of the present invention is not limited to them by any means.

EXAMPLE 1

At first, as a first example, an apparatus in which a target substance in a sample is captured by magnetic particles and the magnetic particles together with the captured target substance are collected will be described with reference to FIG. 5.

Method of Producing Separation Apparatus

Figure 5:
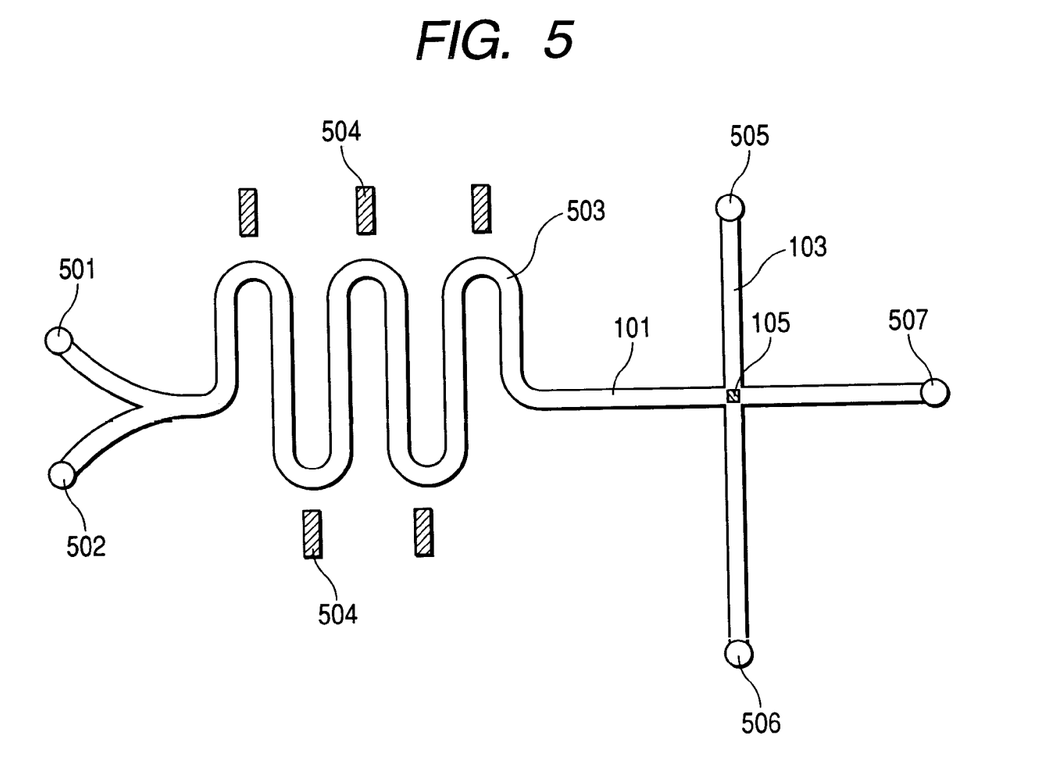
FIG. 5 is a diagrammatic view showing an apparatus for capturing and separating a target substance in the present invention.

At first, an apparatus for capturing and separating a target substance shown in FIG. 5 was used as a fluid conveyance portion. In FIG. 5, reference numeral 501 denotes a port (pump connection portion) for supplying a sample containing a target substance. Reference numeral 502 denotes a port for supplying a capture reagent containing magnetic particles. Reference numeral 503 denotes a reaction flow channel for reacting a sample with a capture reagent. Reference numeral 504 denotes weak magnetic field application means for promoting a reaction between a capture reagent and a sample in the reaction flow channel. The first flow channel 101 is used as a flow channel for conveying the mixed solution of a sample and a capture reagent after a reaction. The capture portion 105 is a capture region for capturing magnetic particles by a magnetic field. The second flow channel 103 is a flow channel for discharging magnetic particles after capture and separation. Reference numeral 505 denotes a supply port for supplying a fluid for discharging magnetic particles. Reference numeral 506 denotes an aspiration port for discharging magnetic particles. Reference numeral 507 is an aspiration port for discharging a waste solution from the mixed solution of a sample and a capture reagent after the reaction.

A method of producing the construction of flow channels for conveying a fluid in this example can utilize a method of producing an element by so-called microfluidics. Here, chip-like flow channels are formed with polydimethylsiloxane (PDMS). A convex shape is formed in advance with a thick film resist having the shape of flow channel construction shown in FIG. 5. Ferrite on a chip is placed in the site of the capture portion 105 having a convex shape, in which port members for connection with the outside are further placed and PDMS is fed thereto to form flow channels. The chip made at the above-described steps is jointed to a glass plate that has been subjected to hydrophilic treatment to allow the formation of a chip. Electromagnets for applying an external magnetic field that correspond to 205 shown in FIG. 2 are disposed as components outside the chip in the upper and lower portions of the capture portion 105 in the chip. Magnets for applying a magnetic field for promoting a reaction that correspond to 504 shown in FIG. 5 are disposed around the reaction flow channel 503. A magnetic field by this magnet is set to have strength to such an extent that magnetic particles are not captured and traverse through the flow channel. Although the use of a permanent magnet is described here, an electromagnet may be used, of course. In addition, syringe pumps for fluid conveyance are respectively connected to the ports 501, 502, 505, 507, and 506.

Method of Producing Capture Reagent

A method of producing a target substance capture reagent used in this example will be described. In this example, human myoglobin is targeted as a target substance. Dynabeads M-270 Epoxy from Dynal Biotech are used as magnetic particles. This beads solution is mixed with a solution of an anti-human myoglobin mouse monoclonal antibody that specifically binds to human myoglobin, and the mixture is incubated overnight. After incubation, the magnet having the magnetic fine particles captured thereto is washed with a phosphate buffer solution containing 0.1% Tween 20 (Trade Name; surfactant, purchased from Kishida Chemical). After wash, the magnetic particles are removed from the magnet and stirred and dispersed in a phosphate buffer solution containing 0.1% Tween 20 to thereby obtain a capture reagent.

Separation Method

The capture reagent produced by the above-described means is introduced into the syringe pump connected to the port for supplying a capture reagent 502 shown in FIG. 5. A sample containing human myoglobin (e.g., human serum) is introduced into the syringe pump connected to the port for supplying a sample 501. A phosphate buffer solution is introduced into the syringe pump connected to the connection portion (supply) 505. The other syringe pumps are kept empty. In separation procedures, a magnetic field is applied to the magnetic particle capture portion 105, while the syringe pumps connected to the ports 501 and 502 are driven to introduce the capture reagent and the sample solution. At the same time, the syringe pump connected to the port 507 is allowed to carry out aspiration at the flow rate corresponding to the sum of flow rates introduced by the port for supplying a sample 501 and the port for supplying a capture reagent 502.

The capture reagent and the sample solution introduced through the ports 501 and 502 form a laminar flow and run in the reaction flow channel 503. At this time, the magnetic particles in the laminar flow move alternately in the cross-sectional directions of the flow channel direction by the magnetic field application means 504 for promoting a reaction. Thereby, the reaction with the sample is promoted. As a result, the human myoglobin in the sample is captured by the anti-human myoglobin antibody on the magnetic particles in the reaction flow channel. Fluid conveyance at the ports 501 and 502 and aspiration at the port 507 are continued so that the solution having the captured human myoglobin is supplied to the capture portion 105. Once fluid conveyance allows a predetermined amount of the mixed solution to pass through the capture portion 105, fluid conveyance at the ports 501 and 502 and aspiration at the port 507 are terminated. At this time, the magnetic particles and the human myoglobin captured by the magnetic particles contained in the amount of the mixed solution of the capture reagent and the sample that has passed through the capture portion 105 are captured in the capture portion 105.

The magnetic field applied to the capture potion 105 is then removed and a phosphate buffer solution is introduced from the port 505 through the flow channel for discharge 103 into the capture portion 105. At the same time, the syringe pump connected to the port 506 is allowed to carry out aspiration at the same flow rate as the flow rate of the supply of the phosphate buffer solution from the port 505. By those procedures, a predetermined amount of the magnetic particles and the human myoglobin captured by the particles can be separated and collected.

EXAMPLE 2

As a second example, the capture and separation of an unknown substance in a sample and the detection of the substance at the detection site will be illustrated.

Construction of Detection Apparatus

Figure 6:
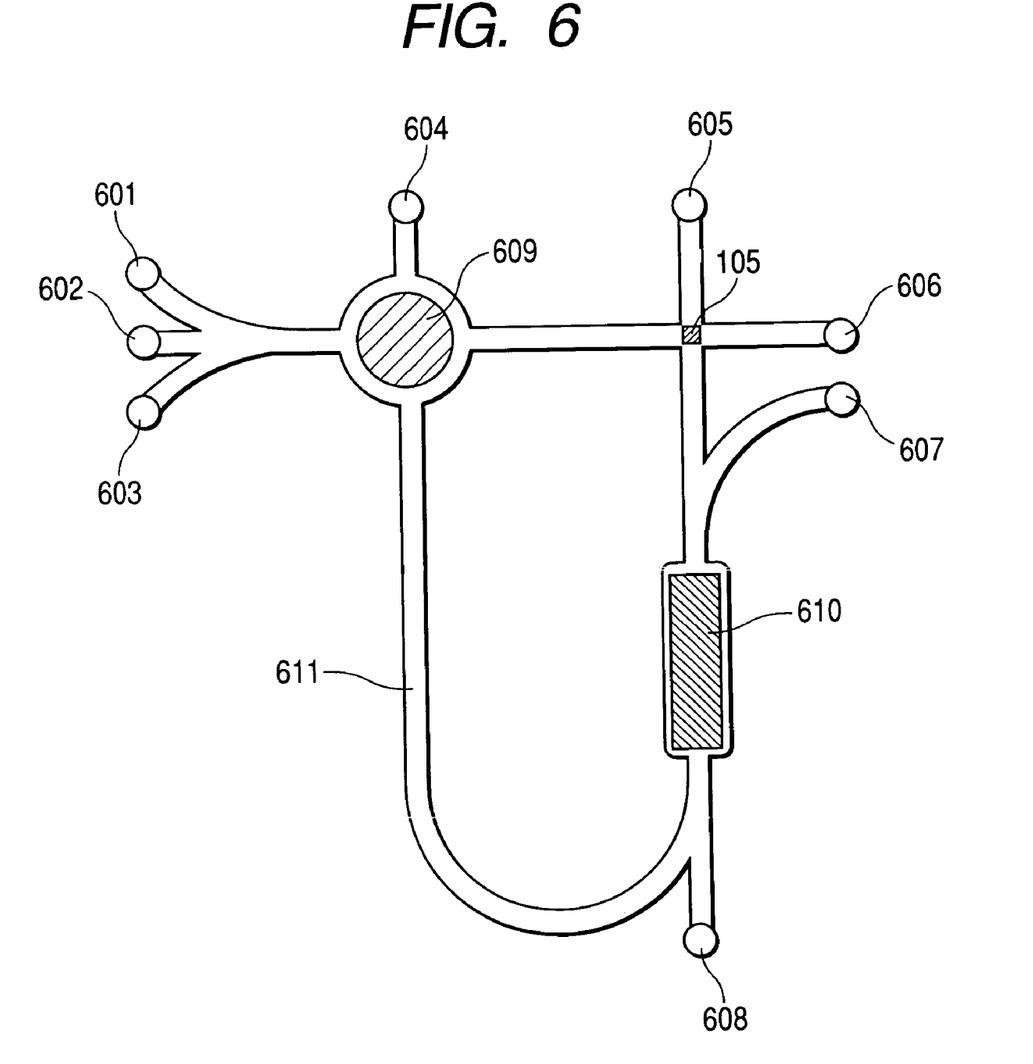
FIG. 6 is a diagrammatic view showing an apparatus for detecting a target substance in the present invention.

Using an apparatus for detecting a target substance shown in FIG. 6, a detection apparatus in this example will be described.

Reference numeral 601 denotes a port for supplying a sample; 602, a port for supplying a capture reagent; 603, a port for supplying a labeling reagent; 604, a connection portion to an outside air valve that is selectable between opening and closing for outside air; 605, a connection portion to a pump for discharging magnetic particles (supply); 606, a connection portion to a pump for supplying magnetic particles (aspiration); 607, a connection portion to a pump for supplying a buffer (supply); 608, a connection portion to a waste solution pump (aspiration); and 609, a reaction region. This reaction region has magnetic field application means selectable between the use and the nonuse of the application of a magnetic field so that magnetic particles can be held. Reference numeral 610 denotes a detection region capable of optical detection. This detection region also has magnetic field application means selectable between the use and the nonuse of the application of a magnetic field so that magnetic particles can be held. Reference numeral 611 denotes a recirculation flow channel capable of returning a fluid from the detection region to the reaction region. A method of producing the flow channels can be conducted in the same way as in Example 1, so that the description is omitted.

Capture Reagent

A method of producing a target substance capture reagent used in this example will be described. In this example, human insulin is targeted as a target substance. Dynabeads M-270 Epoxy from Dynal Biotech are used as magnetic particles. This beads solution is mixed with a solution of an anti-human insulin α subunit mouse monoclonal antibody that specifically binds to the α chain of human insulin, and the mixture is incubated overnight. After incubation, the magnet having the magnetic fine particles captured thereto is washed with a phosphate buffer solution containing 0.1% Tween 20 (surfactant). After wash, the magnetic particles are removed from the magnet and stirred and dispersed-in a phosphate buffer solution containing 0.1% Tween 20 to thereby obtain a capture reagent.

Labeling Reagent

A method of producing a target substance-labeling reagent used in this example will be described. As described above, in this example, human insulin is targeted as a target substance. A solution of an anti-human insulin β subunit mouse monoclonal antibody that specifically binds to the β chain of human insulin unrecognizable by the capture reagent is used as a labeling reagent. This antibody is fluorescently labeled with FITC. Fluoreporter FITC Protein Labeling Kit from Prove is used to carry out FITC labeling. To a reaction tube, 200 μL of the antibody solution is placed and 20 μL of 1 M sodium bicarbonate solution (pH 9.0) is then added. To this, 40 μL of 10 mg/mL FITC dye dissolved in DMSO is added, and the mixture is stirred under the shade at room temperature for 1 hour. For separating unreacted FITC, the mixed solution is centrifuged with a spin column to collect FITC-labeled antibody into the tube. By those procedures, the labeling reagent can be obtained.

Detection Step

At first, an outside air opening valve at the connection portion 604 is kept open, while a sample solution containing human insulin (e.g., human plasma), the capture reagent, and the labeling reagent are injected through the port for supplying a sample 601, the port for supplying a capture reagent 602, and the port for supplying a labeling reagent 603, respectively, into the reaction region 609 to form a complex of the capture reagent, the insulin in the sample, and the labeling reagent. The mixed solution containing the complex in the reaction region 609 is introduced through the aspiration pump at the connection portion 606 into the capture portion 105, with the reaction region 609 open. At this time, a magnetic field is applied to the capture portion 105 to capture the complex of the capture reagent, the insulin, and the labeling agent in the mixed solution, which is passing through the capture portion. After a predetermined amount of the mixed solution passes through the capture portion 105, the aspiration pump at the connection portion 606 is stopped and the outside air valve at the connection portion 604 is closed.

Subsequently, a phosphate buffer solution is supplied through the connection portion to a pump for discharging magnetic particles (supply) 605, while the connection portion to a waste solution pump (aspiration) 608 is allowed to carry out aspiration at the same flow rate. At this time, a magnetic field is applied to the detection region 610 to capture the complex of the capture reagent, the insulin, and the labeling reagent in the detection region. After all of the complexes are introduced into the detection region 610, both pumps at the connection portions 605 and 608 are stopped and the amount of the fluorescent dye captured in the detection region 610 is detected by an optical approach. In this fluorescence detection, if the amount of fluorescence falls within the dynamic range of the detection region, the amount of insulin in the sample is accessed based on this amount of fluorescence and the detection is terminated.

However, if the amount of fluorescence beyond the dynamic range of the detection region is detected, the separation of the complex is conducted again using the capture portion 105 in the same procedures. However, in this case, the amount of the solution with the complex supplied from the reaction region 609 that passes through the capture portion 105 is controlled to decrease and the amount of the complex captured in the capture portion 105 is controlled to decrease so that the amount of fluorescence detected in the detection region 610 reduces.

Alternatively, if the amount of fluorescence detected is less than the dynamic range of the detection region 610, the fluorescence together with the complex captured in the detection region 610 is temporarily recirculated in the reaction region 609. In this case: a phosphate buffer solution is supplied through the pump at the connection portion 607; the outside air valve at the connection portion 604 is opened; a magnetic field is applied to the reaction region 609; and a magnetic field in the detection region 610 is removed. In this state of things, the recirculation flow channel 611 is used to recirculate the complex in the reaction region 609. Thereafter, the capture portion 105 is used again to separate the complex. However, the amount of the solution with the complex supplied from the reaction region 609 that passes through the capture portion 105 is controlled to increase and the amount of the complex captured in the capture portion 105 is controlled to increase so that the amount of fluorescence detected in the detection region 610 increases.

By repeating those procedures until the amount of fluorescence falls within the dynamic range of the detection region, the target substance can be detected in a substantially wide dynamic range.

Because an apparatus for separating magnetic particles of the present invention can reduce foreign substances to a minimum and separate a predetermined amount of magnetic particles from a fluid, the apparatus can be utilized as an apparatus for detecting particular substances in a fluid using magnetic particles and particularly for detecting particular substances such as biomolecules such as proteins, sugars, lipids, and nucleic acids, or cells contained in samples derived from organisms.

This application claims priority from Japanese Patent Application No. 2004-188626 filed on Jun. 25, 2004, which is hereby incorporated by reference herein.

What is claimed is:

1. An apparatus for separating a predetermined amount of magnetic particles in a fluid, comprising:

a fluid conveyance portion having at least a first flow channel for supplying a fluid containing the magnetic particles, a second flow channel for discharging the separated magnetic particles, and an intersection at which the first flow channel and the second flow channel intersect each other;

capture means for capturing a predetermined amount of the magnetic particles in the fluid supplied from the first flow channel to the intersection when a magnetic field is applied to the intersection of the fluid conveyance portion; and discharge means for removing the magnetic field applied to the intersection to discharge the magnetic particles captured by the capture means by way of a medium introduced into the second flow channel.

2. An apparatus for detecting a target substance in a fluid, comprising:
- a fluid conveyance portion having at least means for binding a target substance in a fluid to magnetic particles each having a function of specifically binding to the target substance, a first flow channel for supplying a fluid containing the magnetic particles bound with the target substance, a second flow channel for discharging the separated magnetic particles bound with the target substance, and an intersection at which the first flow channel and the second flow channel intersect each other;
- capture means for capturing a predetermined amount of the magnetic particles bound with the target substance in the fluid supplied from the first flow channel to the intersection when a magnetic field is applied to the intersection of the flow channels;
- discharge means for removing the magnetic field applied to the intersection to discharge the magnetic particles bound with the target substance that have been captured by the capture means by way of a medium introduced into the second flow channel; and
- detection means for detecting an amount of the target substance bound with the magnetic particles discharged by the discharge means.

3. An apparatus for detecting a target substance according to claim 2, wherein the capture means includes magnetic field application means.

4. An apparatus for detecting a target substance according to claim 3, wherein the magnetic field application means comprises an electromagnet.

5. An apparatus for detecting a target substance according to claim 2, wherein the capture means has a member with high magnetic permeability and a member with magnetic permeability smaller than that of the member with high magnetic permeability, which are provided adjacent to each other along the first flow channel.

6. An apparatus for detecting a target substance according to claim 2, wherein the target substance comprises a biomaterial.

7. An apparatus for detecting a target substance according to claim 2, wherein the predetermined amount is controlled according to a sensitivity range of the detection means.

8. An apparatus for detecting a target substance according to claim 2, further comprising means for recirculating the fluid from the detection means to the first flow channel.

9. A method of separating a predetermined amount of magnetic particles in a fluid, comprising the steps of:
- applying a magnetic field to an intersection of intersecting flow channels composed of a first flow channel for supplying a fluid containing the magnetic particles and a second flow channel for discharging the separated magnetic particles, while supplying a fluid containing the magnetic particles from the first flow channel to the intersection, to capture a predetermined amount of the magnetic particles in the fluid; and
- removing the magnetic field applied to the intersection to discharge the captured magnetic particles by way of a medium introduced through the second flow channel.

10. A method of detecting a target substance in a fluid, comprising the steps of:
- binding a target substance in a fluid to magnetic particles each having a function of specifically binding to the target substance;
- applying a magnetic field to an intersection of intersecting flow channels composed of a first flow channel for supplying a fluid containing the magnetic particles bound with tile target substance and a second flow channel for discharging the separated magnetic particles bound with the target substance, while supplying a fluid containing the magnetic particles bound with the target substance from the first flow channel to the intersection, to capture a predetermined amount of the magnetic particles bound with the target substance in the fluid;
- removing the magnetic field applied to the intersection to discharge the captured magnetic particles bound with the target substance by way of a medium introduced through the second flow channel; and
- detecting an amount of the target substance bound with the discharged magnetic particles.

11. A method of detecting a target substance according to claim 10, wherein the fluid containing the magnetic particles has a Reynolds number of 50 or less.

12. A method of detecting a target substance according to claim 10, wherein the magnetic particles exhibit superparamagnetism.

13. A method of detecting a target substance according to claim 10, wherein the magnetic particles have an average particle size of 40 nm or less.

* * * * *

UNITED STATES PATENT AND TRADEMARK OFFICE
CERTIFICATE OF CORRECTION

PATENT NO. : 7,384,561 B2  Page 1 of 1
APPLICATION NO. : 11/165503
DATED : June 10, 2008
INVENTOR(S) : Norihiko Utsunomiya It is certified that error appears in the above-identified patent and that said Letters Patent is hereby corrected as shown below:

COLUMN 16

Line 22, "tile" should read --the--.

Signed and Sealed this

Second Day of December, 2008

JON W. DUDAS
*Director of the United States Patent and Trademark Office*